United States Patent
Liu et al.

(10) Patent No.: US 12,282,840 B2
(45) Date of Patent: Apr. 22, 2025

(54) METHOD AND APPARATUS WITH NEURAL NETWORK LAYER CONTRACTION

(71) Applicants: Samsung Electronics Co., Ltd., Suwon-si (KR); University of Zurich, Zurich (CH)

(72) Inventors: Shih-Chii Liu, Zurich (CH); Bodo Rueckauer, Zurich (CH); Tobi Delbruck, Zurich (CH)

(73) Assignees: Samsung Electronics Co., Ltd., Suwon-si (KR); University of Zurich, Zurich (CH)

( * ) Notice: Subject to any disclaimer, the term of this patent is extended or adjusted under 35 U.S.C. 154(b) by 935 days.

(21) Appl. No.: 16/739,543

(22) Filed: Jan. 10, 2020

(65) Prior Publication Data

US 2020/0226451 A1 Jul. 16, 2020

Related U.S. Application Data

(60) Provisional application No. 62/791,237, filed on Jan. 11, 2019.

(30) Foreign Application Priority Data

Jul. 18, 2019 (KR) .................. 10-2019-0087099

(51) Int. Cl.
*G06N 3/063* (2023.01)
*G06N 3/082* (2023.01)
*G06N 5/046* (2023.01)

(52) U.S. Cl.
CPC ............ *G06N 3/063* (2013.01); *G06N 3/082* (2013.01); *G06N 5/046* (2013.01)

(58) Field of Classification Search
CPC ......... G06N 3/063; G06N 3/082; G06N 5/046
See application file for complete search history.

(56) References Cited

U.S. PATENT DOCUMENTS 10,453,197 B1 * 10/2019 Cholakkal ............... G06T 7/11
11,122,238 B1 * 9/2021 van Amersfoort ..... G06N 3/088
(Continued)

FOREIGN PATENT DOCUMENTS

KR 10-2016-0142791 A 12/2016

OTHER PUBLICATIONS

Rueckauer, Bodo, et al. "Conversion of continuous-valued deep networks to efficient event-driven networks for image classification." Frontiers in neuroscience 11 (2017): 682: 1-12 (Year: 2017).*
(Continued)

*Primary Examiner* — Randall K. Baldwin
(74) *Attorney, Agent, or Firm* — NSIP Law

(57) ABSTRACT

A processor-implemented neural network method includes: determining a reference sample among sequential input samples to be processed by a neural network, the neural network comprising an input layer, one or more hidden layers, and an output layer; performing an inference process of obtaining an output activation of the output layer based on operations in the hidden layers corresponding to the reference sample input to the input layer; determining layer contraction parameters for determining an affine transformation relationship between the input layer and the output layer, for approximation of the inference process; and performing inference on one or more other sequential input samples among the sequential input samples using affine transformation based on the layer contraction parameters determined with respect to the reference sample.

24 Claims, 12 Drawing Sheets

(56) References Cited

U.S. PATENT DOCUMENTS

| | | | |
|---|---|---|---|
| 2016/0034809 A1* | 2/2016 | Trenholm | G06N 3/02 706/20 |
| 2017/0011288 A1 | 1/2017 | Brothers | |
| 2018/0046898 A1 | 2/2018 | Lo | |
| 2018/0046915 A1* | 2/2018 | Sun | G06N 3/0445 |
| 2018/0114114 A1* | 4/2018 | Molchanov | G06N 3/084 |
| 2018/0137406 A1 | 5/2018 | Howard et al. | |
| 2018/0253648 A1 | 9/2018 | Kaskari et al. | |
| 2018/0260703 A1* | 9/2018 | Soljacic | G06N 20/00 |
| 2018/0322606 A1* | 11/2018 | Das | G06T 1/60 |
| 2018/0330238 A1 | 11/2018 | Luciw et al. | |
| 2018/0336468 A1* | 11/2018 | Kadav | G06K 9/6288 |
| 2019/0130275 A1* | 5/2019 | Chen | G06N 3/0454 |
| 2021/0019630 A1* | 1/2021 | Yao | G06N 3/045 |
| 2021/0142170 A1* | 5/2021 | Ozcan | G06N 3/0675 |
| 2021/0248459 A1* | 8/2021 | Li | G06N 3/045 |
| 2021/0350585 A1* | 11/2021 | Bar-On | G06N 3/088 |
| 2022/0067496 A1* | 3/2022 | Sarel | G06N 3/045 |
| 2022/0129759 A1* | 4/2022 | Yao | G06T 9/002 |

OTHER PUBLICATIONS

Nguyen, Duc Minh, Evaggelia Tsiligianni, and Nikos Deligiannis. "Deep learning sparse ternary projections for compressed sensing of images." 2017 IEEE Global Conference on Signal and Information Processing (GlobalSIP). IEEE, 2017: 1125-1129 (Year: 2017).*

Molchanov, Pavlo, et al. "Pruning convolutional neural networks for resource efficient inference." arXiv preprint arXiv:1611.06440 v2 (2017): 1-17 (Year: 2017).*

Rueckauer, Bodo, et al. "Dynamic feature masking in deep neural networks for efficient inference on sequential data" Institute of Neuroinformatics (2018): 1-28 (Year: 2018).*

Braun, Stefan, and Shih-Chii Liu. "Parameter uncertainty for end-to-end speech recognition." ICASSP 2019-2019 IEEE International Conference on Acoustics, Speech and Signal Processing (Icassp). IEEE, May 2019: 5636-5640 (Year: 2019).*

Diao, Zulong, et al. "Dynamic spatial-temporal graph convolutional neural networks for traffic forecasting." Proceedings of the AAAI conference on artificial intelligence. vol. 33. No. 01. Jul. 17, 2019. (Year: 2019).*

Van Amersfoort, Joost, et al. "Transformation-based models of video sequences." arXiv preprint arXiv:1701.08435 (2017): 1-11 (Year: 2017).*

Sulun, Serkan. "Deep learned frame prediction for video compression." arXiv preprint arXiv:1811.10946 (2018): 1-57 (Year: 2018).*

Gautam, K. S., and Senthil Kumar Thangavel. "Video analytics-based intelligent surveillance system for smart buildings." Soft Computing 23 (Mar. 2019): 2813-2837. (Year: 2019).*

Mealey, Thomas, and Tarek M. Taha. "Accelerating inference in long short-term memory neural networks." NAECON 2018—IEEE National Aerospace and Electronics Conference. IEEE, 2018. (Year: 2018).*

Rückauer, Bodo, et al. "Closing the accuracy gap in an event-based visual recognition task." arXiv preprint arXiv:1906.08859 (May 2019). (Year: 2019).*

Ceolini, Enea, et al. "Temporal sequence recognition in a self-organizing recurrent network." 2016 Second International Conference on Event-based Control, Communication, and Signal Processing (EBCCSP). IEEE, 2016. (Year: 2016).*

Moeys, Diederik Paul, et al. "Steering a predator robot using a mixed frame/event-driven convolutional neural network." 2016 Second international conference on event-based control, communication, and signal processing (EBCCSP). IEEE, 2016. (Year: 2016).*

Han, Song et al., "Deep Compression: Compressing Deep Neural Networks with Pruning, Trained Quantization and Huffman Coding." arXiv preprint arXiv:1510.00149, 2015, (14 pages in English).

Iandola, Forrest N., et al., "SqueezeNet: AlexNet-level accuracy with 50x fewer parameters and< 0.5 MB model size." arXiv preprint arXiv:1602.07360, 2016, (13 pages in English).

Miyashita, Daisuke et al., "Convolutional neural networks using logarithmic data representation." arXiv preprint arXiv:1603.01025, 2016 (10 pages in English).

Rastegari, Mohammad, et al. "Xnor-net: Imagenet Classification Using Binary Convolutional Neural Networks." *European conference on computer vision. Springer, Cham*, 2016 (18 pages in English).

Mishra, Asit, et al., "WRPN: Wide Reduced-Precision Networks." arXiv preprint arXiv:1709.01134, 2017 (11 pages in English).

Hubara, Itay, et al., "Quantized Neural Networks: Training Neural Networks with Low Precision Weights and Activations." *The Journal of Machine Learning Research 18.1*, 2017(pp. 6869-6898).

Howard, Andrew G., et al., "Mobilenets: Efficient Convolutional Neural Networks for Mobile Vision Applications." arXiv preprint arXiv:1704.04861, 2017 (9 pages in English).

Cavigelli, Lukas et al., "Cbinfer: Change-Based Inference for Convolutional Neural Networks on Video Data." *Proceedings of the 11th International Conference on Distributed Smart Cameras*, 2017 (9 pages in English).

Rueckauer, Bodo et al., "Dynamic feature masking in deep neural networks for efficient inference on sequential data", *Institute of Neuroinformatics*, Oct. 17, 2018 (pp. 1-28).

Rueckauer, Bodo et al., "Linear Approximation of Deep Neural Networks for Efficient Inference on Video Data." *2019 27th European Signal Processing Conference (EUSIPCO)*. IEEE, 2019 (28 pages in English).

* cited by examiner

Algorithm 1 Network contraction workflow
---
Input: Feed-forward network F(x); sequential dataset $\mathcal{X}$.
Output: Contracted network $C_F$ (x); network output $y$.

{INITIALIZATION}
501 — Transform each layer into a ($\widetilde{W}^k$, $\widehat{b}^k$, $m^k$) triplet {INFERENCE}
    for all $x_t \in \mathcal{X}$ do
502 —   Compute mask update criterion.
503 —   if mask update criterion > threshold then
      • Reset reference point $x_* = x_t$
      • Do regular forward pass to update masks $m^k$ and obtain network output.
      • Contract model by computing (Q, q).
    else
504 —     Compute output of contracted network.
    end if
    end for

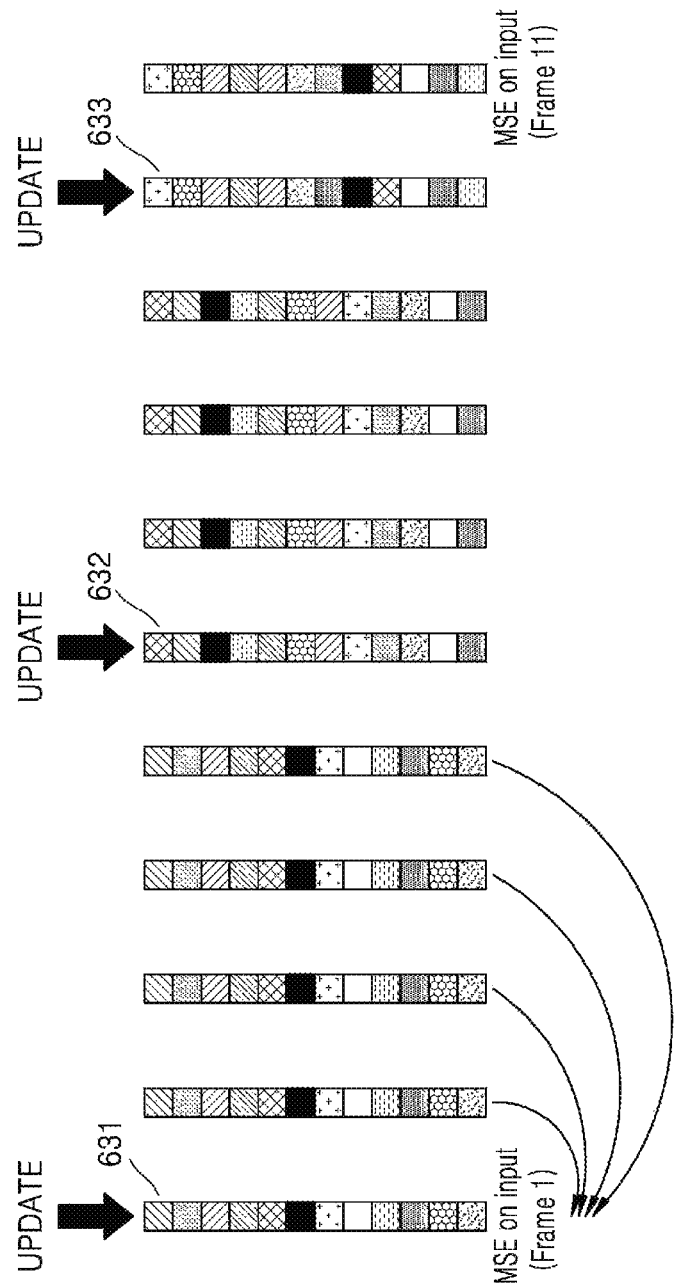

FIG. 7

| Dataset<br>Task | Udacity<br>tracking | MNIST<br>DAE<br>(denoising autoencoder) | KITTI<br>object det. | ImageNet vid.<br>object det. |
|---|---|---|---|---|
| Architecture | 5 Conv<br>1 FC | 5 Conv, 2 FC<br>2 Conv, 2 FC | 23 Conv<br>16 Conv, 1 FC | 23 Conv<br>16 Conv, 1 FC |
| # Parameters | 1 M<br>5 G | 69 k + 109 k<br>69 k + 13 k | 17 M + 34 M<br>17 M + 6 G | 17 M + 34 M<br>17 M + 6 G |
| # Neurons | 151 M<br>5 k | 14 k + 45 k<br>14 k + 784 | 16 M + 1 M<br>16 M + 72 k | 16 M + 1 M<br>16 M + 72 k |
| # Operations | 800 G<br>10 G | 2 M + 44 M<br>2 M + 26 k | 18 G + 12 G<br>18 G + 12 G | 18 G + 12 G<br>18 G + 12 G |
| Metric | –<br>– | 0.016 MSE<br>0.023 MSE | –<br>– | 91.51 mAP<br>92.10 mAP |
| Update rate | 1<br>14 | 1<br>3 | 1<br>6 | 1<br>8 |
| r | 1<br>12 | 1<br>2.76 | 1<br>1 | 1<br>1 |

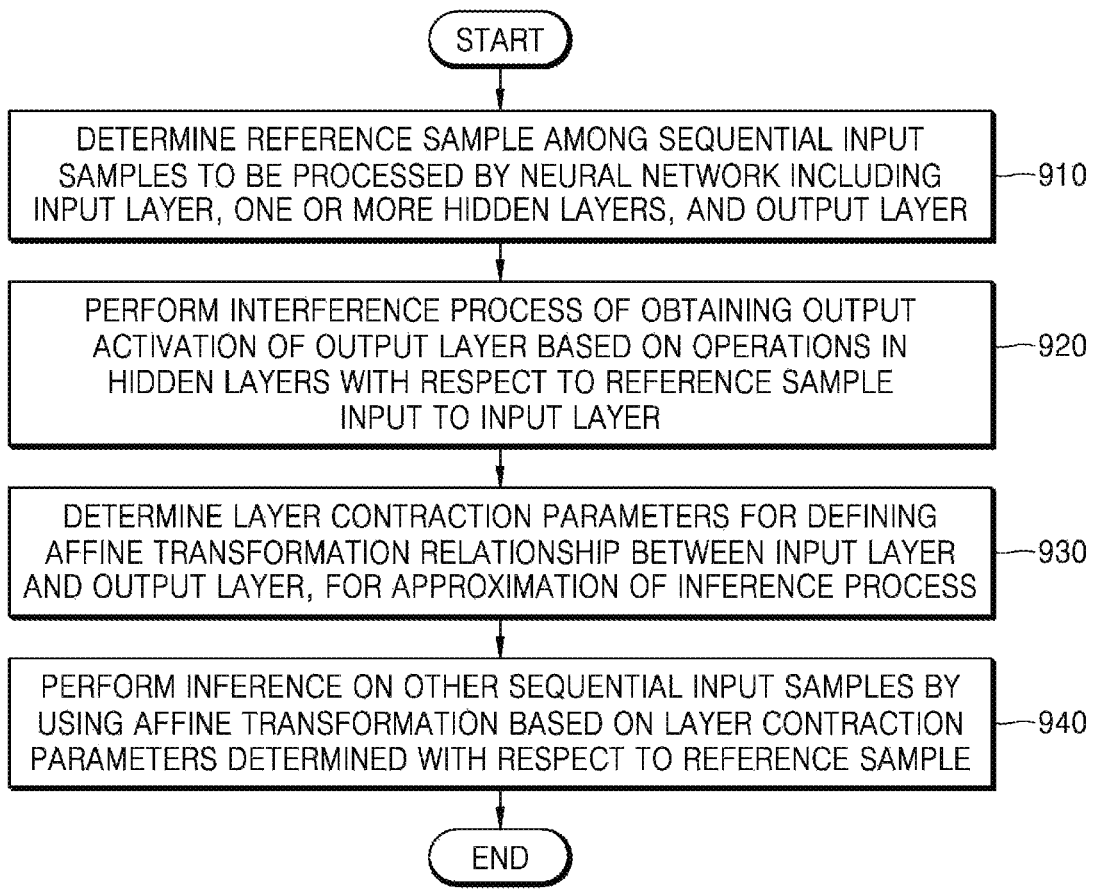

METHOD AND APPARATUS WITH NEURAL NETWORK LAYER CONTRACTION

CROSS-REFERENCE TO RELATED APPLICATIONS

This application claims the benefit of U.S. Provisional Application No. 62/791,237, filed on Jan. 11, 2019, in the US Patent Office and Korean Patent Application No. 10-2019-0087099, filed on Jul. 18, 2019, in the Korean Intellectual Property Office, the disclosures of which are incorporated herein in their entireties by reference.

BACKGROUND

1. Field

The present disclosure relates to methods and apparatuses with neural network layer contraction.

2. Description of Related Art

Neural networks may be implemented using a computational architecture. With the recent development of neural network technology, studies are actively being conducted on analyzing input data using a neural network and extracting valid information in various types of electronic systems. An apparatus for processing a neural network may perform a large amount of operations on complex input data. A typical apparatus for processing a neural network inefficiently processes operations when analyzing a large amount of input data in real time using a neural network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network method includes: determining a reference sample among sequential input samples to be processed by a neural network, the neural network comprising an input layer, one or more hidden layers, and an output layer; performing an inference process of obtaining an output activation of the output layer based on operations in the hidden layers corresponding to the reference sample input to the input layer; determining layer contraction parameters for determining an affine transformation relationship between the input layer and the output layer, for approximation of the inference process; and performing inference on one or more other sequential input samples among the sequential input samples using affine transformation based on the layer contraction parameters determined with respect to the reference sample.

The layer contraction parameters determined with respect to the current reference sample may include a single weight matrix indicating weights, a bias vector indicating biases, and a binary mask.

The binary mask may be a vector determined to perform activation masking by replacing an operation of an activation function performed in each of the hidden layers.

The affine transformation may be a transformation of a multiply-accumulate (MAC) operation and an operation of an activation function in the hidden layers, based on a form of a Hadamard product using the layer contraction parameters.

The method may include: determining whether to update the reference sample; and in response to determining to update the reference sample, updating the reference sample to a current input sample, and updating the layer contraction parameters based on the updated reference sample, wherein the current input sample is an input sample subsequent to the reference sample among the sequential input samples.

The method may include performing inference on the current input sample based on the updated layer contraction parameters.

The method may include, in response to determining not to update the reference sample, performing inference on the current input sample based on the layer contraction parameters determined with respect to the reference sample.

The determining of whether to update the reference sample may include determining to update the reference sample in response to performing inference on an n-number of the sequential input samples following the reference sample.

The determining of whether to update the reference sample may include comparing a mean-square error (MSE) value between the current input sample and the reference sample with a threshold value.

The determining of whether to update the reference sample may include determining to update the reference sample to be the current input sample, in response to the MSE value being greater than or equal to a predetermined threshold value.

The determining of whether to update the reference sample may include comparing a mean-square error (MSE) value between an inference result of an input sample preceding the current input sample and an inference result of the reference sample with a threshold value.

The determining of whether to update the reference sample may be based on whether signs of intermediate activations of each layer of the neural network are changed by a determined frequency by a binary mask determined for each layer of the neural network.

Each of the sequential input samples may correspond to each of consecutive frames of video data, and the determining of the reference sample may include determining image data of a first frame of the consecutive frames to be the reference sample.

The performing of the inference may include determining either one of an image recognition result and a voice recognition result.

A non-transitory computer-readable storage medium may store instructions that, when executed by at least one processor, configure the at least one processor to perform the method.

In another general aspect, a neural network data apparatus includes: at least one processor configured to: determine a reference sample among sequential input samples to be processed by a neural network, the neural network comprising an input layer, one or more hidden layers, and an output layer; perform an inference process of obtaining an output activation of the output layer based on operations in the hidden layers corresponding to the reference sample input to the input layer; determine layer contraction parameters for determining an affine transformation relationship between the input layer and the output layer, for approximation of the inference process; and perform inference on one or more other sequential input samples among the sequential input samples using affine transformation based on the layer contraction parameters determined with respect to the reference sample.

The layer contraction parameters determined with respect to the current reference sample may include a single weight matrix indicating weights, a bias vector indicating biases, and a binary mask.

The binary mask may be a vector determined to perform activation masking by replacing an operation of an activation function performed in each of the hidden layers.

The affine transformation may be a transformation of a multiply-accumulate (MAC) operation and an operation of an activation function in the hidden layers, based on a form of a Hadamard product using the layer contraction parameters.

The at least one processor may be configured to: determine whether to update the reference sample; and in response to determining to update the reference sample, update the reference sample to a current input sample, and update the layer contraction parameters based on the updated reference sample, wherein the current input sample is an input sample subsequent to the reference sample among the sequential input samples.

For the determining of whether to update the reference sample, the at least one processor may be configured to determine to update the reference sample in response to performing inference on an n-number of the sequential input samples following the reference sample.

For the determining of whether to update the reference sample, the at least one processor may be configured to compare a mean-square error (MSE) value between the current input sample and the reference sample with a threshold value.

For the determining of whether to update the reference sample, the at least one processor may be configured to compare a mean-square error (MSE) value between an inference result of input samples before the current input sample and an inference result of the reference sample with a threshold value.

For the determining of whether to update the reference sample, the at least one processor may be configured to determine whether signs of intermediate activations of each layer of the neural network are changed by a determined frequency by a determined mask determined for each layer of the neural network.

Other features and aspects will be apparent from the following detailed description, the drawings, and the claims.

BRIEF DESCRIPTION OF THE DRAWINGS

FIG. 5 illustrates an algorithm for describing a method of performing inference using layer contraction of a neural network, according to one or more embodiments.

FIGS. 6A to 6D are views for describing methods of determining whether to update a reference sample, according to one or more embodiments.

FIG. 7 illustrates a comparison between an inference using an original neural network and an inference using a layer-contracted neural network, according to one or more embodiments.

FIG. 9 is a flowchart of a method of processing input data using the layer contraction of a neural network, according to one or more embodiments.

Figure 1:
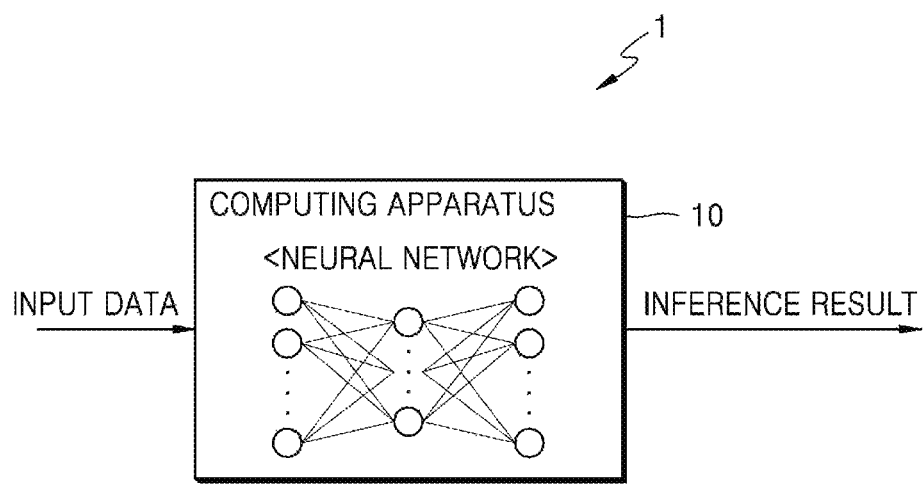
FIG. 1 illustrates a computing system for processing input data using a neural network, according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

In the description of the embodiments, when a part is connected to another part, it includes not only a case where the part is directly connected but also a case where the part is electrically connected with another part in between. Also, when a part includes a constituent element, it means that the embodiment may include other elements other than the exclusion of other elements unless specifically stated otherwise.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Reference will now be made in detail to embodiments, examples of which are illustrated in the accompanying drawings, wherein like reference numerals refer to like elements throughout. In this regard, the one or more embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the present disclosure have been selected from currently widely used general terms in consideration of the functions in the present disclosure. However, the terms may vary according to the intention of one of ordinary skill in the art after an understanding of the present disclosure, case precedents, and the advent of new technologies. Also, for special cases, meanings of the terms selected by the applicant are described in detail in the description section. Accordingly, the terms used in the present disclosure are defined based on their meanings in relation to the contents discussed throughout the specification, not by their simple meanings.

Terms such as "include" or "comprise" may not be construed to necessarily include any and all constituent elements or steps described in the specification, but may be construed to exclude some of the constituent elements or steps or further include additional constituent elements or steps.

Hereinafter, the present disclosure will be described in detail by explaining preferred embodiments of the disclosure with reference to the attached drawings. However, the present disclosure is not limited thereto and it will be understood, after an understanding of the present disclosure, that various changes in form and details may be made therein.

FIG. 1 illustrates a computing system 1 for processing input data using a neural network, according to one or more embodiments.

Referring to FIG. 1, the computing system 1 for processing a neural network may perform inference using a neural network on various types of input data such as image data, video data, audio/voice data, sensed data measured by using an external/internal sensor, and/or network data received through a network. In this state, an inference result of a neural network may include various types (e.g., such as an image recognition result, a video surveillance, a voice recognition result, anomaly detection, and/or biosignal monitoring), and thus the computing system 1 may be a system that can be employed in various technical fields (e.g., such as autonomous driving, Internet of Things (IoT), and/or medical monitoring).

A computing apparatus 10 may use a neural network to perform inference of input data. A neural network (NN) may be implemented by an architecture of a deep neural network (DNN) and/or an n-layer neural network. A DNN and/or an n-layer neural network may correspond to convolutional neural networks (CNN), feed-forward neural networks, deep belief networks, and/or AutoEncoder. In other words, the computing apparatus 10 may perform inference of input data by employing one or more of various types of neural networks.

The computing apparatus 10 may correspond to personal computers (PCs), server devices, and/or mobile devices, and furthermore may be a device provided in autonomous vehicles, robotics, smartphones, tablets devices, augmented reality (AR) devices, and/or Internet of Things devices, which perform voice recognition or image recognition using a neural network, but the present disclosure is not limited thereto and the computing apparatus 10 may correspond to various other types of devices.

Figure 2:
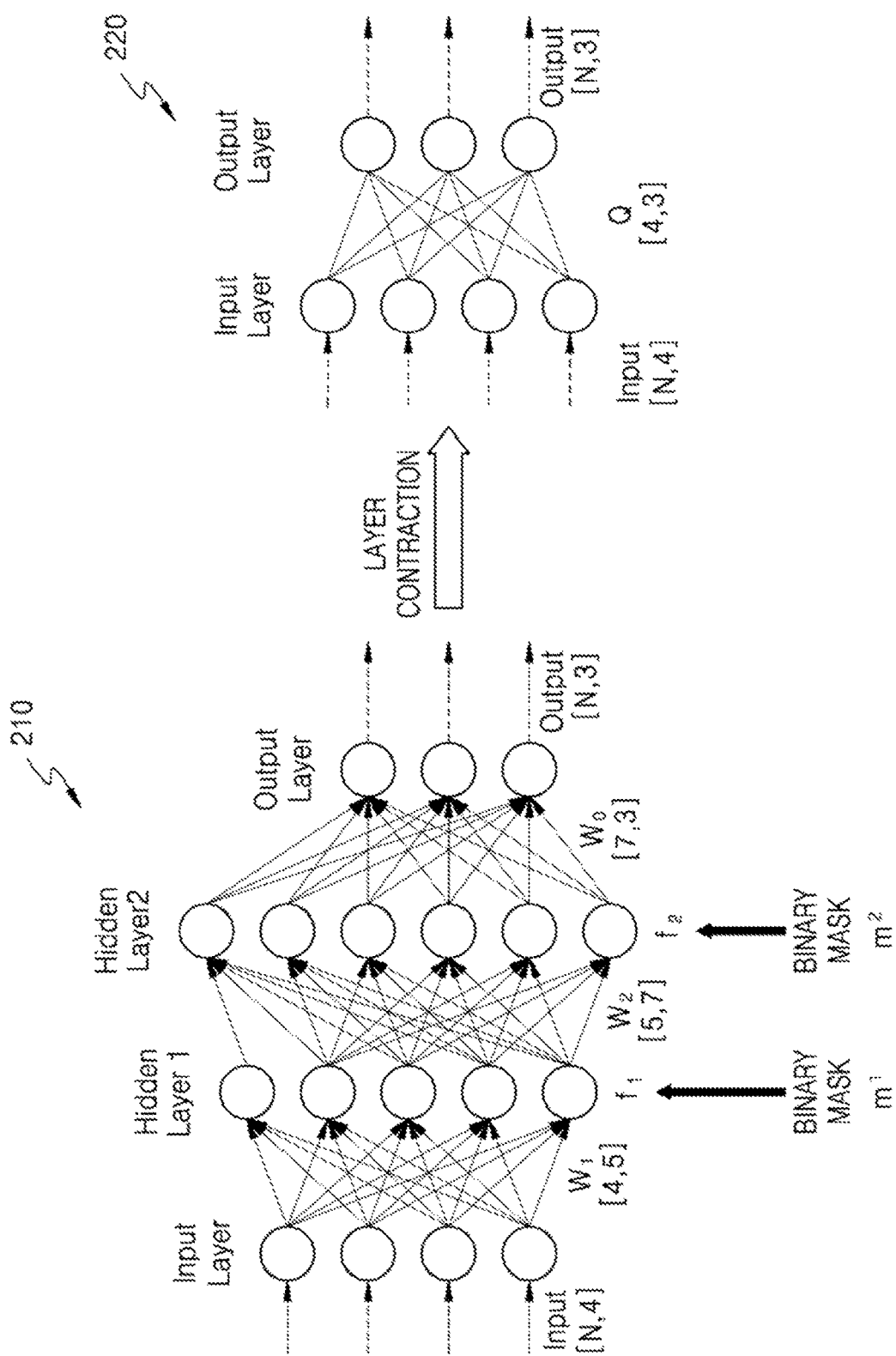
FIG. 2 illustrates layer contraction of a neural network, according to one or more embodiments.

FIG. 2 illustrates layer contraction of a neural network 210, according to one or more embodiments.

Referring to FIG. 2, the neural network 210 may be a DNN and/or an n-layer neural network which includes an input layer, one or more hidden layers, and an output layer. For example, as illustrated in FIG. 2, the neural network 210 may be a DNN including an input layer, two hidden layers (Hidden Layer 1 and Hidden Layer 2), and an output layer, but the neural network 210 may be implemented to include more hidden layers. As the number of layers included in the neural network 210 increases, the complexity of datasets that may be processed by the neural network 210 may likewise increase, and thus accurate inferences may be determined by the neural network 210. However, in a typical neural network, as numerous operation processes are performed between a plurality of neurons (or channels) that are complexly interconnected between layers of the typical neural network, when the number of layers or neurons is large, an amount of computations for inference of the typical neural network may be large and thus an operation speed of the typical neural network may be slow. In particular, as the typical neural network performs a floating-point based operation, an amount of operations and time consumed for inference may be inefficient according to network complexity of the typical neural network. However, such inefficiencies of the typical neural network may be improved upon by the neural network 210, e.g., by implementing layer contraction as disclosed in one or more embodiments herein.

An n-layer fully-connected NN such as the neural network 210 may be represented by Equation 1 below, for example.

$$F(x) = W^n f(W^{n-1} \ldots f(W^1 x + b^1) + \ldots + b^{n-1}) + b^n \quad \text{Equation 1:}$$

In Equation 1, F denotes a neural network output, x denotes a neural network input, and a (Wk, Bk) pair denotes weights and biases in a layer k (k∈[1, n], k and n are natural numbers).

In each hidden layer, output activation in each layer may be calculated by using an activation function. The activation function may be expressed for example, by Equation 2 below.

$$f(z_i^k) = \begin{cases} z_i^k & \text{if } z_i^k > 0 \\ \alpha z_i^k & \text{else} \end{cases} \quad \text{Equation 2}$$

In Equation 2, which is a Sigmoid function, $.Z_i^k$ is pre-activation of neuron i in a layer k, and output activation in the layer k may be calculated by a summed output of total neurons in the layer k. α denotes a leak parameter. A leak parameter α may have a small value (for example, α=0.1). When the leak parameter α is 0, Equation 2 may correspond to a model of a standard rectified linear unit (ReLU). When the leak parameter α is not 0, Equation 2 denotes a leaky ReLU. Softmax may be used as a Sigmoid function.

According to the present embodiment, the neural network 210 may be deformed by layer contraction to a neural network 220. In other words, the neural network 220 may be a layer-contracted neural network having an input layer and an output layer only, without one or more hidden layers, and the output layer may be calculated by the input layer and a single weight matrix Q. In other words, various operations (matrix multiplication, bias addition, and Sigmoid operation) typically performed in hidden layers may be substituted or replaced by an operation of the single weight matrix Q. The single weight matrix Q is a layer contraction parameter, and the dimension of the single weight matrix Q is (N_0, N_n), where N_0 is the number of neurons in the input layer and N_n is the number of neurons in the output layer. The layer contraction parameter may include different types of parameters, which is described below in detail by Equation 3, for example.

$$F(x) = W^n m^{n-1} \odot (W^{n-1} \ldots m^1 \odot (W^1 x + b^1) + \ldots + b^{n-1}) + b^n \qquad \text{Equation 3:}$$

Equation 3 is a model of the layer-contracted neural network 220, which is induced from Equation 1 that is a model of the neural network 210, for example.

In Equation 3, a binary mask $m^k$ is a vector having the same length as the number of neurons in the layer k. The binary mask $m^k$, which is a vector that replaces the activation function of each layer, may be determined by Equation 4 below, for example.

$$m_i^k = \begin{cases} 1 & \text{if } z_i^k > 0 \\ \alpha & \text{else} \end{cases} \qquad \text{Equation 4}$$

In Equation 3, a $\odot$ sign denotes a Hadamard product. The model of the layer-contracted neural network 220 is based on a form of a Hadamard product using layer contraction parameters as shown in Equation 3, for example.

Furthermore, the model of the layer-contracted neural network 220 of Equation 3 may be determined by an affine transformation as shown below in Equation 5, for example.

$$F(x) = Q|_x x + q|_x$$

$$Q|_x = W^n m^{n-1} \odot W^{n-1} \ldots m^1 \odot W^1$$

$$q|_x W^n m^{n-1} \odot (W^{n-1} \ldots m^1 \odot b^1 + \ldots + b^{n-1}) + b^n \qquad \text{Equation 5:}$$

In Equation 5, Q denotes a single weight matrix, and q denotes a bias vector.

In other words, the model of the neural network 210 may be transformed to the model of the layer-contracted neural network 220 (e.g., using Equation 5) by using layer contraction parameters (single weight matrix Q, bias vector q, and binary mask m) that define an affine transformation relationship from the input layer.

According to the present embodiment, compared to a typical neural network, the amount of operations may be decreased and an operation speed may be increased in hidden layers through the above layer contraction of the neural network 210, and thus an efficiency of the neural network 210 inference may be improved over the typical neural network.

Figure 3:
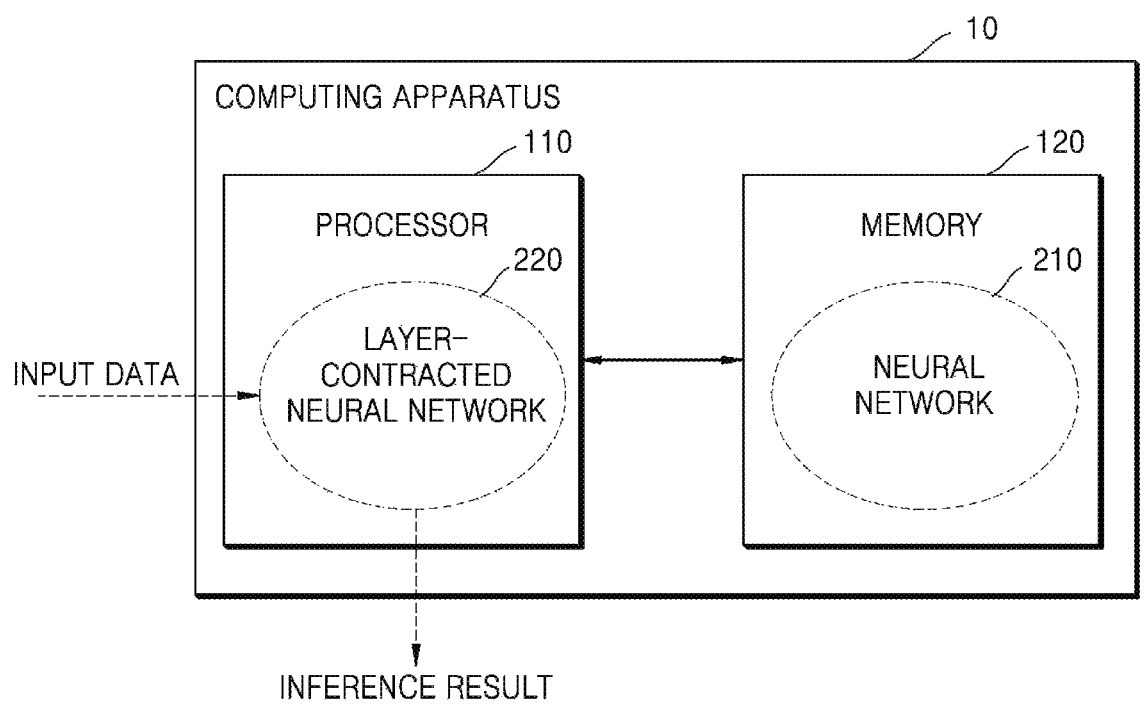
FIG. 3 is a block diagram of a hardware configuration of a computing apparatus, according to one or more embodiments.

FIG. 3 is a block diagram of a hardware configuration of the computing apparatus 10 according to one or more embodiments.

Referring to FIG. 3, the computing apparatus 10 may correspond to an apparatus that performs a neural network inference on the computing system 1 that processes the above-described neural network. The computing apparatus 10 may include a processor 110 (e.g., one or more processors) and a memory 120 (e.g., one or more memories). The computing apparatus 10 may further include other constituent elements in addition to the constituent elements illustrated in FIG. 3.

The processor 110 may perform general functions for controlling the computing apparatus 10 provided with the processor 110. The processor 110 may generally control the computing apparatus 10 by executing programs stored in the memory 120. For example, the processor 110 may execute various inference processes to perform neural network inference on input data.

The processor 110 may correspond to a central processing unit (CPU), a graphics processing unit (GPU), an application processor (AP), and/or a neural processing unit (NPU), but the present disclosure is not limited thereto.

The memory 120 is hardware for storing various pieces of data processed in the processor 110. For example, the memory 120 may store pieces of neural network data regarding the neural network 210, pieces of data generated as the processor 110 trains the neural network 210, and pieces of data of the layer-contracted neural network 220, which is generated by the processor 110. Furthermore, the memory 120 may store various applications to be driven by the processor 110, for example, an application for neural network inference and training, or an application regarding an algorithm for determining an abnormal signal.

The memory 120 may include a least one of volatile memory or non-volatile memory. The non-volatile memory may include read-only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), and ferroelectric RAM (FRAM). The volatile memory may include dynamic RAM (DRAM), static RAM (SRAM), synchronous DRAM (SDRAM), phase-change RAM (PRAM), magnetic RAM (MRAM), resistive RAM (RRAM), and ferroelectric RAM (FeRAM). In one or more embodiments, the memory 120 may be implemented in at least one of a hard disk drive (HDD), a solid state drive (SSD), compact flash (CF), secure digital (SD), micro secure digital (Micro-SD), mini secure digital (Mini-SD), extreme digital (xD), or Memory Stick.

The processor 110 may generate the layer-contracted neural network 220, by performing layer contraction processes on the neural network 210 stored in the memory 120. Accordingly, the processor 110 may output an inference result using the layer-contracted neural network 220, regarding input data obtained from the inside or outside of the computing apparatus 10.

The processes in which the processor 110 generates the layer-contracted neural network 220 and perform inference on input data are described below in detail.

Figure 4:
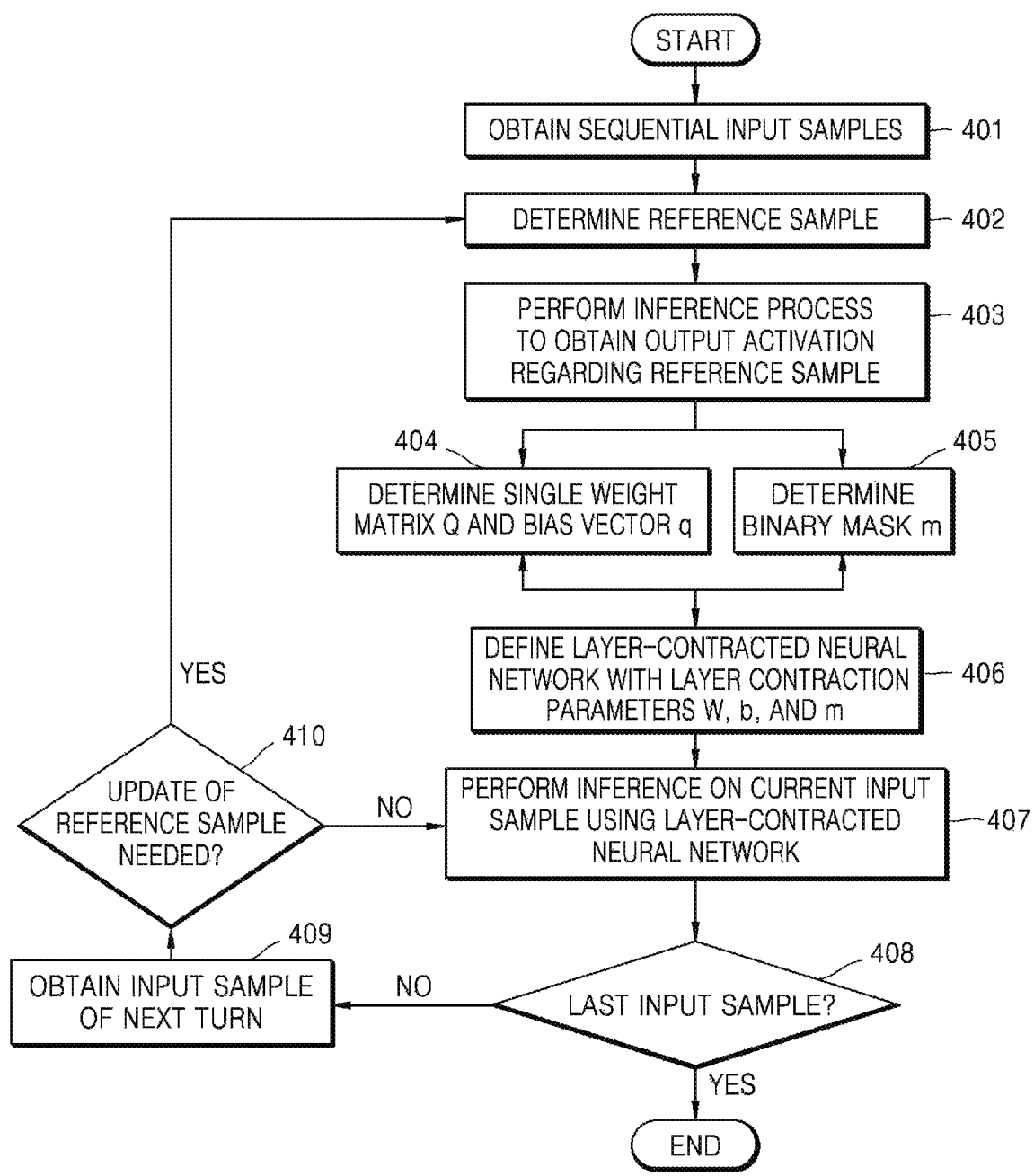
FIG. 4 is a flowchart of a method of processing input data using the layer contraction of a neural network, according to one or more embodiments.

FIG. 4 is a flowchart of a method of processing input data using the layer contraction of a neural network according to one or more embodiments.

Referring to FIG. 4, in operation 401, the processor 110 may obtain, as input data, sequential input samples to be processed by a neural network including an input layer, one or more hidden layers, and an output layer. In this state, each of the sequential input samples may be one corresponding to each of consecutive frames of video data, but the present disclosure is not limited thereto. In other words, the sequential input samples may correspond to voice/audio data samples or may be various other types of data samples such as bio signal data samples. The sequential input samples may be video/image/voice/audio data received from an external network of the computing apparatus 10 or data measured or acquired using a sensor provided in the computing apparatus 10. In other words, sources of the input data may be various.

In operation 402, the processor 110 may determine a reference sample from among the sequential input samples. For example, when the sequential input samples are individual frames of video data, the processor 110 may determine image data of a first frame of the frames to be a first reference sample. The reference sample may be a sample to be used to obtain an output activation in operation 403, for example.

In operation 403, the processor 110 may perform an inference process to obtain an output activation of an output layer of a neural network based on operations in hidden layers performed based on a current reference sample input to an input layer of the neural network. In this state, the operations in the hidden layers may include a multiply-accumulate (MAC) operation, bias addition, and/or an activation function using a Sigmoid function. For example, the processor 110 may calculate the output activation by using the above-described models of Equations 1 and 2.

In operations 404 and 405, for layer contraction through approximation of the inference process in the operation 403, the processor 110 may determine layer contraction parameters that define an affine transformation relationship between the input layer and the output layer. In other words, the processor 110 may determine a single weight matrix Q denoting a weight W described in Equation 5, a bias vector q denoting a bias b, and a binary mask m. The binary mask m may be a vector for performing activation masking by replacing an operation of the activation function performed in each of the hidden layers.

In operation 406, the processor 110 may determine a layer-contracted neural network (NN) with the layer contraction parameters (the weight W of the single weight matrix Q, the bias b of the bias vector q, and the binary mask m). In other words, the processor 110 may determine the model (for example, using the affine transformation, of Equation 5) as the layer-contracted neural network.

In operation 407, the processor 110 may perform inference on a current input sample by using a layer-contracted neural network. For example, the current input sample may correspond to the current reference sample or to an input sample of the next turn of the current reference sample.

In operation 408, the processor 110 may determine whether the current input sample processed in the operation 407 is the last input sample among the sequential input samples. When the current input sample is determined to be the last input sample, inference on all input sample included in the input data may be terminated. However, when the current input sample is not determined to be the last input sample, operation 409 may be performed.

In the operation 409, the processor 110 may obtain an input sample of the next turn to be processed following the input sample processed in the operation 407.

In operation 410, the processor 110 may determine whether to update a reference sample, before inference is performed on the input sample obtained in the operation 409.

When the processor 110 determines not to update a reference sample, operation 407 may be performed, and inference may be determined using the input sample obtained in the operation 409 by using the layer-contracted neural network determined based on the existing reference sample.

However, when the processor determines to update a reference sample, operation 402 may be performed, and another input sample among the input samples that are not processed may be determined to be a new reference sample instead of the existing reference sample. Thereafter, a layer-contracted neural network may be newly determined based on the updated reference sample, and until the reference sample is updated again, inference may be performed on the other input samples by using a newly determined layer-contracted neural network.

According to the method described in FIG. 4, compared to a typical neural network data processing method, an amount of operations of a neural network may be reduced by the layer contraction, and as an operation speed may increase, efficient inference may be performed on the sequential input samples.

In particular, sequential data like individual frames of video data having many spatio-temporal redundancies may be efficiently processed in the neural network inference of one or more embodiments of the present application. In other words, whereas a large number of computations for processing redundant inputs (pixel values) may be performed in operations in layers of a typical neural network regarding video data, the method of the present application makes the operations efficient and simple. That is, according to the present embodiment, as an inference result approximate to the sequential samples having spatio-temporal redundancies may be obtained by using a layer-contracted neural network determined based on the reference sample, an amount of inference operations may be reduced compared to that of a typical neural network processing, thereby enabling more efficient inference.

An example of obtaining of an approximated inference result using a layer-contracted neural network is described below in detail.

$$T_F(x) = F(x_*) + J_F|_{x_*}(x - x_*) + \quad \text{Equation 6:}$$

Equation 6 shows a model of approximating an output F of a neural network by using a Taylor expansion of an input sample x around an input sample $x_*$ determined to be a reference sample.

In Equation 6, $$J_F|_{x_*} = \frac{\partial F}{\partial x}\bigg|_{x_*}$$

is a Jacobian of F evaluated in $x_*$. An output $C_F$ of a layer-contracted neural network expressed as in Equation 7 may follow a Taylor approximation around the input sample $x_*$ determined to be the reference sample.

$$C_F(x) = Q|_{x_*} x + q|_{x_*} \quad \text{Equation 7:}$$

As in Equation 8, the output $C_F$ of a layer-contracted neural network may be the same as the original neural network F (that is, Equation 1, for example).

$$C_F(x_*) = Q|_{x_*} x_* + q|_{x_*} = F(x_*) \quad \text{Equation 8:}$$

When the $0^{th}$ order term in the Taylor expansion of Equation 6 is substituted by using Equations 7 and 8, it may be expressed as in Equation 9, for example.

$$T_F(x) = q|_{x_*} + (Q|_{x_*} - J_F|_{x_*})x_* + J_F|_{x_*}x + \quad \text{Equation 9:}$$

In comparison between the terms of Equations 7 and 9, when the single weight matrix Q approximates to Jacobian, the point that the first-order Taylor expansion is equivalent to the layer-contracted neural network may be induced in Equation 10, for example.

$$C_F(x) = T_F^{(1)}(x) \text{ if } Q|_{x_*} = J_F|_{x_*} \qquad \text{Equation 10:}$$

When the relationship between the first-order Taylor expansion of the original neural network and the layer-contracted neural network is established, an affine transformation may be equivalent to the inference process of multiple layers with respect to the input sample $x_*$ corresponding to the reference sample.

Accordingly, an approximated inference result may be obtained by using a layer-contracted neural network instead of a typical neural network.

FIG. 5 illustrates an algorithm for describing a method of performing inference using the layer contraction of a neural network, according to one or more embodiments.

Referring to FIG. 5, an input of an algorithm may be the original neural network F and a sequential dataset X, and an output of the algorithm may be a layer-contracted neural network $C_F$ and a network output Y.

In operation 501 of the algorithm, each layer of the original neural network F may be transformed into a .($\tilde{W}^k$, $\tilde{b}^k, m^k$) triplet that corresponds to layer contraction parameters. Operation 501 is a process for layer contraction.

From operation 502 of the algorithm, the operations correspond to inference processes using a layer-contracted neural network.

In the operation 502 of the algorithm, it may be determined whether to update a reference sample during inference.

In operation 503 of the algorithm, when it is determined to update a reference sample, the input sample $x_*$ corresponding to the reference sample may be reset to a new input sample $x_r$. Inference on an updated reference sample may be performed by the original neural network, and thus the binary mask $m^k$ may be updated and an inference result on an updated reference sample may be obtained. Then, a new layer-contracted neural network having new layer contraction parameters (Q, q) based on the reference sample may be determined. In other words, the layer contraction parameters and the layer-contracted neural network may be updated (changed) together according to the update (change) of the reference sample.

In operation 504 of the algorithm, when it is determined not to update a reference sample, an inference result on the current input sample may be obtained by a current layer-contracted neural network.

The algorithm may be terminated on the completion of inference on all input samples, that is, the sequential dataset X.

FIGS. 6A to 6D are views for describing methods of determining whether to update a reference sample, according to embodiments.

Referring to FIGS. 6A to 6D, the processor 110 of FIG. 3 may determine whether to update a reference sample, before inference on a current input sample is performed using an existing layer-contracted neural network determined based on an existing reference sample. As described above, the layer-contracted neural network may be determined by approximating the original neural network. However, when an inference result of a layer-contracted neural network on the current input sample satisfies a condition of not approximating to the inference result by the original neural network, the processor 110 determines to redetermine or update the layer-contracted neural network to be optimal to the current input sample.

Figure 6A:
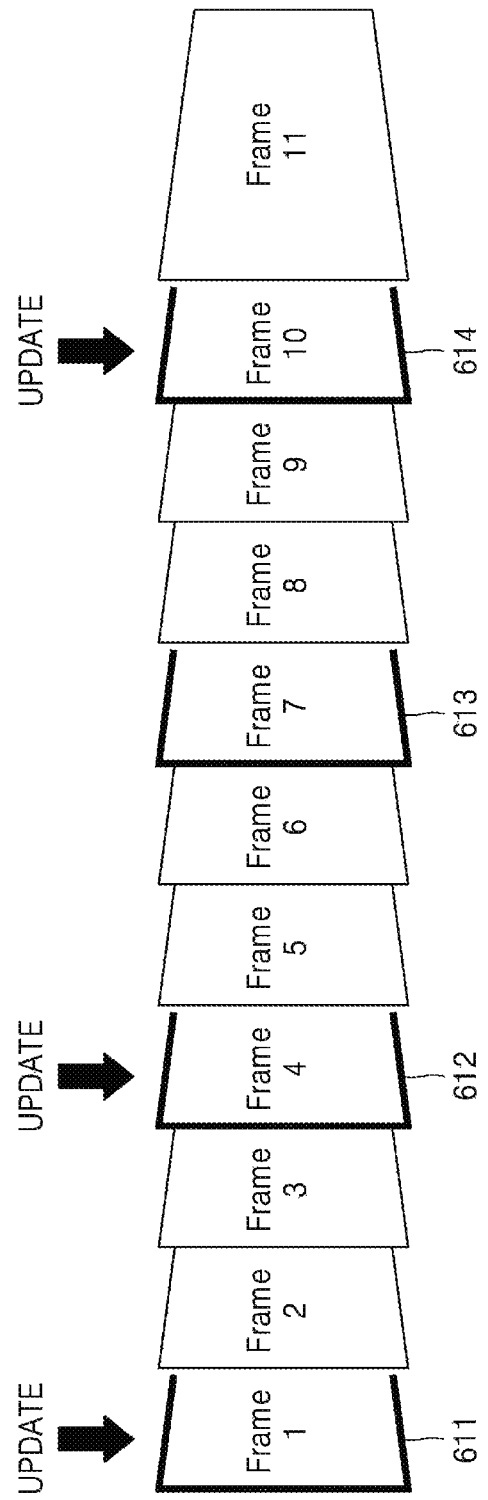

Referring to FIG. 6A, according to an example, the processor 110 may determine to update an existing reference sample once inference has been performed on n-number of input samples, where n is a natural number, following a current reference sample 611, 612, 613, or 614. For example, the processor 110 may determine to update the existing reference sample every $n^{th}$ input sample (or $n^{th}$ frame), wherein n=3, such that the existing reference sample is consecutively updated from the current reference sample 611, to current reference sample 612, to current reference sample 613, and to current reference sample 614. In other words, a reference sample may be updated in a certain interval in the sequential input samples. When, for example, sequential input samples are individual frames of video data, transformation between frames according to time passage may be generated. Accordingly, the above-described update is to compensate for the transformation.

Figure 6B:
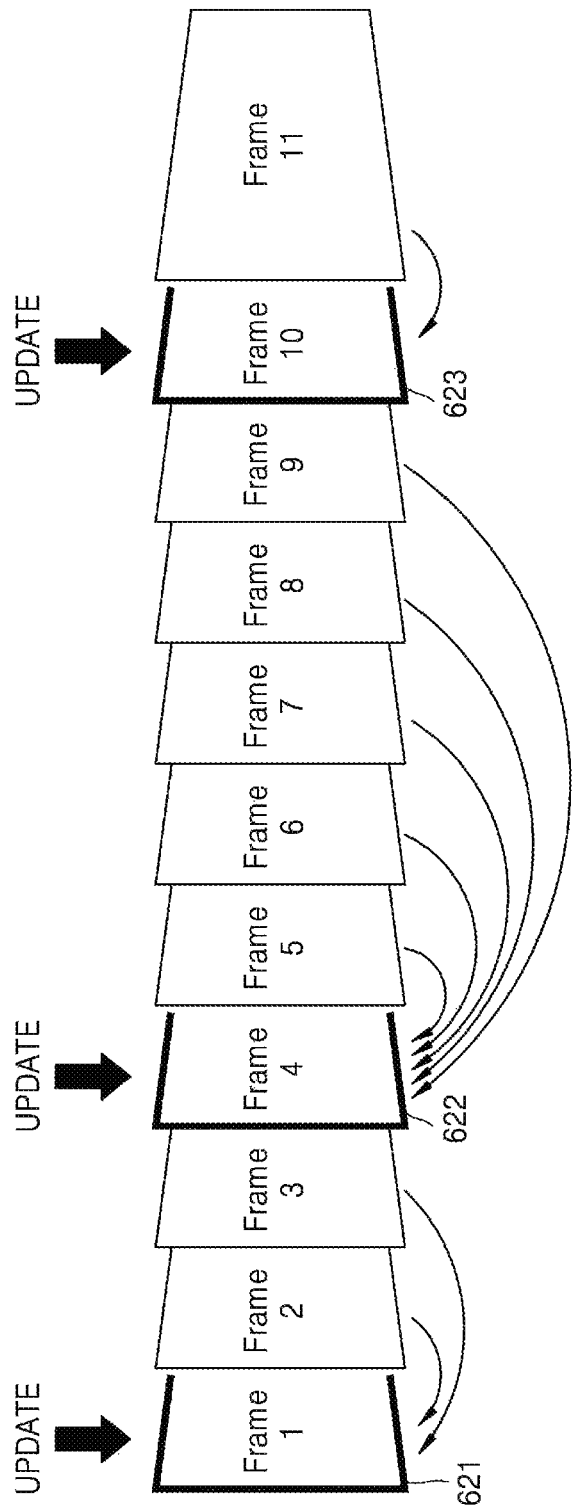

Referring to FIG. 6B, according to another example, the processor 110 may determine whether to update the existing reference sample 621, 622, or 623 by comparing mean-square error (MSE) values (e.g., pixel-wise square difference) between a current input sample and the existing reference sample 621, 622, or 623. Unlike the method of FIG. 6A, in the method of FIG. 6B, which may be referred to as the MSE on an input method, inference using a layer-contracted neural network generated to be optimal to a current input sample may be performed by accurately determining an input sample (frame) where actual transformation is generated. For example, when an MSE between a current input sample and the existing reference sample is greater than or equal to a predetermined threshold value, the processor 110 may determine to update the existing reference sample to be the current input sample. As another example, when the MSE between a current input sample and the existing reference sample is less than the predetermined threshold value, the processor 110 may determine not to update the existing reference sample.

Referring to FIG. 6C, according to another example, the processor 110 may determine whether to update an existing reference sample 631, 632, or 633 by comparing the MSE value between an inference result of input samples just before the current input sample and an inference result of the existing reference sample 631, 632, or 633 with a certain threshold value. Like FIG. 6B, according to the method of FIG. 6C, which is referred to as the MSE on the output method, as an input sample (frame) where actual transformation is generated is accurately determined, inference may be performed by using a layer-contracted neural network generated to be optimal to the current input sample. For example, when an MSE between an inference result of an input sample immediately preceding the current input sample and an inference result of the existing reference sample is greater than or equal to a predetermined threshold value, the processor 110 may determine to update the existing reference sample to be the current input sample. As another example, when an MSE between an inference result of an input sample immediately preceding the current input sample and an inference result of the existing reference sample is greater than or equal to a predetermined threshold value, the processor 110 may determine not to update the existing reference sample.

Figure 6D:
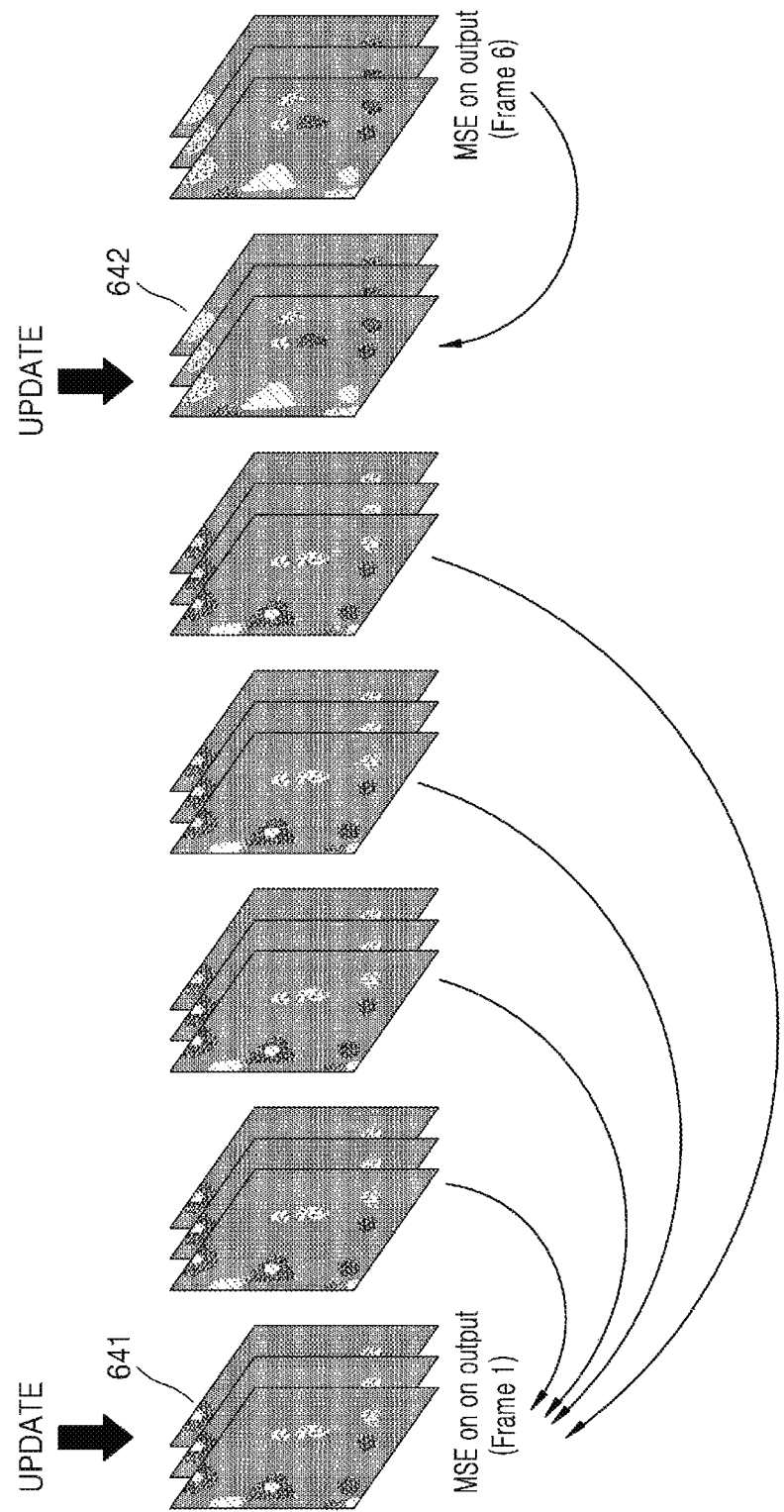

Referring to FIG. 6D, according to another example, the processor 110 may determine whether to update a reference sample, based on whether signs of intermediate activations are changed as many as a certain frequency by a binary mask determined for each layer. Like FIGS. 6B and 6C, as the method of FIG. 6D determines whether to update the existing reference sample 641 or 642, based on whether the current layer-contracted neural network is suitable for the inference of a current input sample, inference may be performed by using a layer-contracted neural network generated to be optimal to the current input sample.

The certain threshold value and the certain frequency described in FIG. 6B to FIG. 6D correspond to certain values that may be changed by various conditions such as the performance, operation environment, and user settings of the processor 110.

FIG. 7 illustrates a comparison between an inference using an original neural network and an inference using a layer-contracted neural network, according to one or more embodiments.

In the table of FIG. 7, the first line in each entry includes values about the original neural network, and the second line includes values about layer-contracted neural network.

Referring to FIG. 7, it may be seen that the layer-contracted neural network has simple architecture and a small number of neurons and parameters compared with the original neural network. Accordingly, as the amount of operations consumed for inference using a layer-contracted neural network may be reduced, an inference result approximated to the inference result by the original neural network may be obtained, thereby enabling efficient inference.

r Is a compression factor and defined by Equation 11 below. In Equation 11, N denotes the number of neurons in a layer, and $f_{in}$ is fan-in and denotes the number of connections of the neurons.

$$r = r_C + r_{update}(1 - r_C) \qquad \text{Equation 11}$$

$$r_{update} = \#updates/\#samples$$

$$r_C = \frac{C_{no\text{-}update}}{C_{update}} = \frac{C_{contracted}}{C_{standard}}$$

$$C_{contracted} = 2N_0 N_n + N_n = (2N_0 + 1)N_n$$

$$C_{standard} = \sum_{k}^{n} 2N_k f_{in,k} + N_k = \sum_{k}^{n} (2f_{in,k} + 1)N_k$$

Referring to FIG. 7, it may be seen that the layer-contracted neural network has a superior compression ratio compared to the original neural network.

Figure 8:
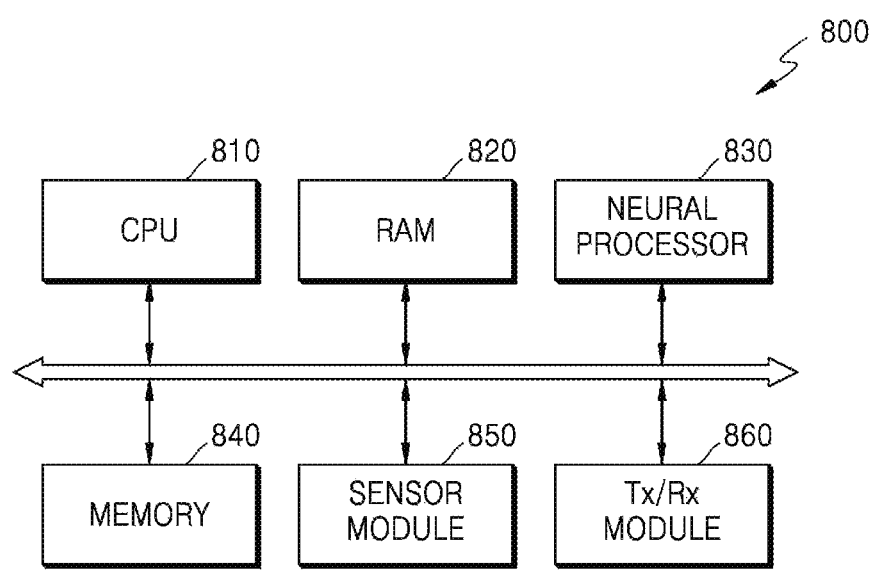
FIG. 8 is a block diagram of an electronic system according to one or more embodiments.

FIG. 8 is a block diagram of an electronic system 800 according to one or more embodiments.

Referring to FIG. 8, the electronic system 800 may control elements of an electronic device in which the electronic system 800 is mounted, by processing input data using the layer contraction of a neural network. For example, the electronic system 800 may be applied to robot devices such as drones and advanced drivers assistance systems (ADAS), smart TVs, smartphones, medical devices, mobile devices, video display devices, measurement devices, or IoT devices, and additionally mounted in at least one of various types of electronic devices. In another example, the electronic system 800 includes the electronic device, or the electronic system 800 is external to the electronic device.

The electronic system 800 may include a CPU 810, a RAM 820, a neural processor 830, a memory 840, a sensor module 850, and a communication module 860. The electronic system 800 may further include an input/output module, a security module, or a power control apparatus. Some of hardware configurations of the electronic system 800 may be mounted on at least one of semiconductor chips. The neural processor 830 may be a neural network dedicated hardware accelerator or an apparatus including the same.

The CPU 810 may control the overall operation of the electronic system 800. The CPU 810 may include one processor core (single core) or a plurality of processor cores (multi-core). The CPU 810 may process or execute programs and/or data stored in the memory 840. The CPU 810 may control functions of the neural processor 830 by executing the programs stored in the memory 840. The CPU 810 may perform control with a GPU or an AP.

The RAM 820 may temporarily store programs, data, or instructions. For example, the programs and/or data stored in the memory 840 may be temporarily stored in the RAM 820 according to the control of the CPU 810 or booting codes. The RAM 820 may be implemented by memory such as DRAM or SRAM.

The neural processor 830 may perform inference of a neural network based on the received input data. The neural network may include CNNs, recurrent neural networks (RNNs), deep belief networks, or restricted Boltzman machines, but the present disclosure is not limited thereto. The neural processor 830, which may be hardware that performs the above-described layer contraction and performs processes using a layer-contracted neural network, may correspond to the above-described neural network dedicated hardware accelerator.

An information signal may include one of various types of recognition signals such as a voice recognition signal, an object recognition signal, an image recognition signal, and a bio information recognition signal. For example, the neural processor 830 may receive frame data included in a video stream, as input data, and may generate, from frame data, a recognition signal regarding an object included in an image indicated by the frame data. However, the present disclosure is not limited thereto, and the neural processor 830 may receive various types of input data and generate a recognition signal according to input data, according to the type or function of an electronic apparatus in which the electronic system 800 is mounted.

The memory 840, which is a storage for storing data, may store operating system (OS), various programs, and various pieces of data. For example, the memory 840 may store neural network data used by the neural processor 830, for example, parameters, weights, biases, or binary masks.

The memory 840 may be DRAM, but the present disclosure is not limited thereto. The memory 840 may include at least one of volatile memory or non-volatile memory. The non-volatile memory may include ROM, PROM, EPROM, EEPROM, flash memory, PRAM, MRAM, RRAM, or FRAM. The volatile memory may include DRAM, SRAM, SDRAM, PRAM, MRAM, RRAM, or FeRAM. In one or more embodiments, the memory 840 may include at least one of HDD, SSD, $C_F$, SD, Micro-SD, Mini-SD, xD, or Memory Stick.

The sensor module 850 may collect information around an electronic apparatus in which the electronic system 800 is mounted. The sensor module 850 may sense or receive signals from the outside of an electronic apparatus, for example, an image signal, a voice signal, a magnetic signal, a bio signal, or a touch signal, and transform the sensed or received signal to data. To this end, the sensor module 850 may include at least one of various types of sensing apparatuses, for example, a microphone, a photographing apparatus, an image sensor, a light detection and ranging (LIDAR) sensor, an ultrasonic sensor, an infrared sensor, a bio sensor, and a touch sensor.

The sensor module 850 may provide transformed data, as input data, to the neural processor 830. For example, the sensor module 850 may include an image sensor and generate a video stream by photographing the external environment of an electronic apparatus and provide consecutive data frames of the video stream in order, as input data, to the neural processor 830. However, the present disclosure is not limited thereto, and the sensor module 850 may provide various types of data to the neural processor 830.

The communication module 860 may include various wired or wireless interfaces capable of communicating with an external apparatus. For example, the communication module 860 may include a communication interface capable of connecting to a wired local area network (LAN), a wireless local area network (WLAN) such as wireless fidelity (Wi-Fi), wireless personal area network (WPAN) such as Bluetooth, wireless universal serial bus (USB), Zigbee, near field communication (NFC), radio-frequency identification (RFID), power line communication (PLC), or a mobile cellular network such as 3rd generation (3G), 4th generation (4G), or long term evolution (LTE).

FIG. 9 is a flowchart of a method of processing input data using the layer contraction of a neural network, according to one or more embodiments. As the method of FIG. 9 is related to the embodiments described with the above-described drawings, the contents described above in the drawings, omitted in the following description though, may be applied to the method of FIG. 9.

In operation 910, the processor 110 may determine a reference sample among sequential input samples to be processed by a neural network including an input layer, one or more hidden layers, and an output layer.

In operation 920, the processor 110 may perform an interference process of obtaining an output activation of an output layer based on operations in the hidden layers with respect to the reference sample input to the input layer.

In operation 930, the processor 110 may determine layer contraction parameters for defining an affine transformation relationship between the input layer and the output layer, for approximation of the inference process.

In operation 940, the processor 110 may perform inference on the other sequential input samples by using affine transformation based on the layer contraction parameters determined with respect to the reference sample.

The computing systems, computing apparatuses, processors, memories, electronic systems, CPUs, RAMs, neural processors, sensor modules, communication modules, computing system 1, computing apparatus 10, processor 110, memory 120, electronic system 800, CPU 810, RAM 820, neural processor 830, memory 840, sensor module 850, communication module 860, and other apparatuses, units, modules, devices, and other components described herein with respect to FIGS. 1-9 are implemented by or representative of hardware components. Examples of hardware components that may be used to perform the operations described in this application where appropriate include controllers, sensors, generators, drivers, memories, comparators, arithmetic logic modules, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic module, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network method, the method comprising:

determining a reference sample among sequential input samples to be processed by a neural network, the neural network comprising an input layer, one or more hidden layers, and an output layer;

performing an inference process by calculating an output activation of the output layer based on operations of an activation function performed in the hidden layers corresponding to the reference sample input to the input layer;

determining layer contraction parameters that define an affine transformation relationship between the input layer and the output layer, for approximation of the inference process, the layer contraction parameters comprising a binary mask vector for performing activation masking by replacing an operation of the activation function performed in the hidden layers;

contracting, based on the layer contraction parameters, the neural network by performing activation masking using the binary mask vector to remove at least one of the hidden layers from the neural network to create a layer-contracted neural network; and performing, using the layer-contracted neural network, in response to a value determined based on one or more pixel values of the reference sample and one or more pixel values of one or more input samples subsequent to the reference sample among the sequential input samples being greater than or equal to a threshold value, inference on the one or more input samples subsequent to the reference sample using affine transformation based on the layer contraction parameters determined with respect to the reference sample.

2. The method of claim 1, wherein the layer contraction parameters determined with respect to the reference sample comprise a single weight matrix indicating weights, a bias vector indicating biases, and the binary mask.

3. The method of claim 2, wherein the binary mask is a vector determined to perform activation masking by replacing an operation of the activation function performed in each of the hidden layers.

4. The method of claim 2, wherein the affine transformation is a transformation of a multiply-accumulate (MAC) operation and an operation of the activation function in the hidden layers, based on a form of a Hadamard product using the layer contraction parameters.

5. The method of claim 1, further comprising:
determining whether to update the reference sample; and
in response to determining to update the reference sample, updating the reference sample to a current input sample, and updating the layer contraction parameters based on the updated reference sample,
wherein the current input sample is an input sample subsequent to the reference sample among the sequential input samples.

6. The method of claim 5, further comprising performing inference, using the layer-contracted neural network, on the current input sample based on the updated layer contraction parameters.

7. The method of claim 5, further comprising, in response to determining not to update the reference sample, performing inference, using the layer-contracted neural network, on the current input sample based on the layer contraction parameters determined with respect to the reference sample.

8. The method of claim 5, wherein the determining of whether to update the reference sample comprises determining to update the reference sample in response to performing inference, using the layer-contracted neural network, on an n-number of the sequential input samples following the reference sample.

9. The method of claim 5, wherein the determining of whether to update the reference sample comprises comparing a mean-square error (MSE) value between the current input sample and the reference sample with the threshold value to determine a result of the comparison.

10. The method of claim 9, wherein the determining of whether to update the reference sample comprises determining to update the reference sample to be the current input sample, in response to the MSE value being greater than or equal to a predetermined threshold value.

11. The method of claim 5, wherein the determining of whether to update the reference sample comprises comparing a mean-square error (MSE) value between an inference result of an input sample preceding the current input sample and an inference result of the reference sample with the threshold value to determine a result of the comparison.

12. The method of claim 5, wherein the determining of whether to update the reference sample is based on whether signs of intermediate activations of each layer of the neural network are changed by a determined frequency by the binary mask determined for each layer of the neural network.

13. The method of claim 1, wherein
each of the sequential input samples corresponds to each of consecutive frames of video data, and
the determining of the reference sample comprises determining image data of a first frame of the consecutive frames to be the reference sample.

14. The method of claim 1, wherein the performing of the inference comprises determining either one of an image recognition result and a voice recognition result.

15. A non-transitory computer-readable storage medium storing instructions that, when executed by at least one processor, configure the at least one processor to perform the method of claim 1.

16. A neural network data apparatus comprising:
at least one processor configured to:
   determine a reference sample among sequential input samples to be processed by a neural network, the neural network comprising an input layer, one or more hidden layers, and an output layer;
   perform an inference process by calculating an output activation of the output layer based on operations of an activation function performed in the hidden layers corresponding to the reference sample input to the input layer;
   determine layer contraction parameters that define an affine transformation relationship between the input layer and the output layer, for approximation of the inference process, the layer contraction parameters comprising a binary mask vector for performing activation masking by replacing an operation of the activation function performed in the hidden layers;
   contract, based on the layer contraction parameters, the neural network by performing activation masking using the binary mask vector to remove at least one of the hidden layers from the neural network to create a layer-contracted neural network; and
   perform, using the layer-contracted neural network, in response to a value determined based on one or more pixel values of the reference sample and one or more pixel values of one or more input samples subsequent to the reference sample among the sequential input samples being greater than or equal to a threshold value, inference on the one or more input samples subsequent to the reference sample using affine transformation based on the layer contraction parameters determined with respect to the reference sample.

17. The apparatus of claim 16, wherein the layer contraction parameters determined with respect to the current reference sample comprise a single weight matrix indicating weights, a bias vector indicating biases, and the binary mask.

18. The apparatus of claim 17, wherein the binary mask is a vector determined to perform activation masking by replacing an operation of the activation function performed in each of the hidden layers.

19. The apparatus of claim 17, wherein the affine transformation is a transformation of a multiply-accumulate (MAC) operation and an operation of the activation function in the hidden layers, based on a form of a Hadamard product using the layer contraction parameters.

20. The apparatus of claim 16, wherein the at least one processor is configured to:
   determine whether to update the reference sample; and
   in response to determining to update the reference sample, update the reference sample to a current input sample, and update the layer contraction parameters based on the updated reference sample,
   wherein the current input sample is an input sample subsequent to the reference sample among the sequential input samples.

21. The apparatus of claim 20, wherein, for the determining of whether to update the reference sample, the at least one processor is configured to determine to update the reference sample in response to performing inference, using the layer-contracted neural network, on an n-number of the sequential input samples following the reference sample.

22. The apparatus of claim 20, wherein, for the determining of whether to update the reference sample, the at least one processor is configured to compare a mean-square error (MSE) value between the current input sample and the reference sample with the threshold value to determine a result of the comparison.

23. The apparatus of claim 20, wherein, for the determining of whether to update the reference sample, the at least one processor is configured to compare a mean-square error (MSE) value between an inference result of input samples before the current input sample and an inference result of the reference sample with the threshold value to determine a result of the comparison.

24. The apparatus of claim 20, wherein, for the determining of whether to update the reference sample, the at least one processor is configured to determine whether signs of intermediate activations of each layer of the neural network are changed by a determined frequency by a determined mask determined for each layer of the neural network.

* * * * *